(12) United States Patent
Praceus et al.

(10) Patent No.: US 11,836,924 B2
(45) Date of Patent: Dec. 5, 2023

(54) ASSISTED OR AUTOMATIC GENERATING OF A DIGITAL REPRESENTATION OF AN ANNULUS STRUCTURE OF A VALVE OF A HUMAN INTERNAL ORGAN

(71) Applicant: LARALAB GmbH, Munich (DE)

(72) Inventors: Julian Praceus, Munich (DE); Aleksei Vasilev, Munich (DE)

(73) Assignee: LARALAB GmbH, Munich (DE)

( * ) Notice: Subject to any disclaimer, the term of this patent is extended or adjusted under 35 U.S.C. 154(b) by 296 days.

(21) Appl. No.: 17/279,410

(22) PCT Filed: Sep. 25, 2019

(86) PCT No.: PCT/EP2019/075919
§ 371 (c)(1),
(2) Date: Mar. 24, 2021

(87) PCT Pub. No.: WO2020/064866
PCT Pub. Date: Apr. 2, 2020

(65) Prior Publication Data
US 2022/0012887 A1 Jan. 13, 2022

(30) Foreign Application Priority Data
Sep. 25, 2018 (EP) ..................................... 18196601

(51) Int. Cl.
*G06K 9/00* (2022.01)
*G06T 7/11* (2017.01)
(52) U.S. Cl.
CPC ...... *G06T 7/11* (2017.01); *G06T 2207/10076* (2013.01); *G06T 2207/10081* (2013.01);
(Continued)
(58) Field of Classification Search
CPC .... G06T 2207/30048; A61B 2576/023; G06V 2201/031
See application file for complete search history.

(56) References Cited

U.S. PATENT DOCUMENTS

| 2015/0366532 A1* | 12/2015 | Voigt | A61B 8/488 |
| | | | 600/408 |
| 2019/0043191 A1* | 2/2019 | Piazza | A61B 5/1075 |
| 2019/0125295 A1* | 5/2019 | Tek | G16H 40/63 |
| 2019/0362548 A1* | 11/2019 | Hatanaka | G06T 7/149 |
| 2020/0082531 A1* | 3/2020 | de Vaan | A61F 2/2418 |

(Continued)

OTHER PUBLICATIONS

International Search Report corresponding to International application No. PCT/EP2019/075919 dated Nov. 14, 2019 (3 pages).

(Continued)

*Primary Examiner* — Atiba O Fitzpatrick
(74) *Attorney, Agent, or Firm* — Maginot, Moore & Beck LLP

(57) ABSTRACT

A method and a system automatically generate a digital representation of an annulus structure of a valve from a segmented digital representation of a human internal heart. The basis for the segmented digital representation is multi-slice computed tomography image data. The method includes automatically determining, for at least a first effective time point, based on a segmentation, i.e. labels, of a provided input segmented digital representation, a candidate plane, and/or a candidate orientation vector together with a candidate center point, arranged with respect to the input segmented digital representation for the first effective time point, and candidate points for the annulus structure are determined automatically. From the candidate points acting as support points, a candidate spline interpolation is generated which is then adapted based on the input segmented digital representation. The digital representation of the annulus structure is then generated based on the adapted candidate spline interpolation.

16 Claims, 7 Drawing Sheets

(52) U.S. Cl.
CPC ............... *G06T 2207/20081* (2013.01); *G06T 2207/20084* (2013.01); *G06T 2207/20096* (2013.01); *G06T 2207/20101* (2013.01); *G06T 2207/30048* (2013.01); *G06T 2207/30052* (2013.01)

(56) References Cited

U.S. PATENT DOCUMENTS

2020/0226831 A1* 7/2020 Su .......................... G06T 7/251
2021/0279886 A1* 9/2021 Peters .................... G06T 7/149

OTHER PUBLICATIONS

Veronesi, Federico, et al., "3D Evaluation of Tricuspid Annulus Morphology in Patients with Pulmonary Hypertension," Computing in Cardiology, 2013, 40:241-244 (4 pages).

Orderud, Fredrik, et al., "Automatic Alignment of Standard Views in 3D Echocardiograms Using Real-Time Tracking," Medical Imaging 2009; Ultrasonic Imaging and Signal Processing, Proc. of SPIE vol. 7265, 72650D-1 ( 8 pages).

Veronesi, Federico, et al., "A Novel Software Tool to Semi-Automatically Characterize Tricuspid Valve Function and Shape Using Trans-Thoracic 3D Echocardiography," University of Padua, Department of Cardiac, Thoracic and Vascular Sciences, Padua, Italy, 2013 (1 page).

Blanke, Philipp, MD, et al., "A Simplified D-Shaped Model of the Mitral Annulus to Facilitate CT-Based Sizing Before Transcatheter Mitral Valve Implantation," J Cardiovasc Comput Tomogr. 2014: 8(6): 459-467. doi: 10.1016/j.jcct.2014.09.009 (19 pages).

The One Hundred Layers Tiramisu: Fully Convolutional DenseNets for Semantic Segmentation, Simon Jegou et al., CVPR Workshop, Computer Vision Foundation; arXiv:1611.09326 [cs.CV] Nov. 28, 2016.

* cited by examiner

ASSISTED OR AUTOMATIC GENERATING OF A DIGITAL REPRESENTATION OF AN ANNULUS STRUCTURE OF A VALVE OF A HUMAN INTERNAL ORGAN

This application is a 35 U.S.C. § 371 National Stage Application of PCT/EP2019/075919, filed on Sep. 25, 2019, which claims the benefit of priority to Serial No. EP 18196601.1, filed on Sep. 25, 2018 in Europe, the disclosures of which are incorporated herein by reference in their entirety.

FIELD OF THE INVENTION

The present invention pertains to medical image processing, in particular to generating a digital representation of an annulus structure of a valve of a human internal organ. The term annulus structure shall comprise in particular an anatomically distinct annulus tissue structure of the valve, or a portion of the human internal organ that is considered to be an annulus of the valve or that has or provides annulus-like properties for the valve.

Although applicable for any kind of valve of a human organ, the present invention and the corresponding underlying problems will be explained especially in detail in conjunction with a valve of a human heart, in particular an atrioventricular valve such as a tricuspid valve or a mitral valve.

BACKGROUND OF THE INVENTION

In modern medicine, medical imaging techniques play an important role. In particular, computed tomography (CT), especially multi-slice CT, or magnetic resonance (MR) images, acquired with or without a contrast agent, provide ever more detailed and accurate images of internal organs. These bare images alone already help a skilled physician to some degree to assess, for example, a procedure to be performed or to gauge the size of an implant to be inserted into an organ. Multi-dimensional digital representations (e.g. reconstructed 3-dimensional, or more-dimensional, surfaces and/or multi-dimensional voxel objects) of the acquired medical images can enable a physician or a skilled technician to better understand the corresponding organ of the specific patient. In particular with regard to implants such as annular implants or artificial valve implants, the same individual organ is different for each patient, especially with regard to its geometric configuration.

However, the sheer amount of data provided by digital representations of medical images combined with the multitude of potential viewing angles, cross-sections, zoom or scaling factors, false-coloring options and so on can easily confuse even skilled physicians when they are trying to evaluate distances or geometric relations within the digital representation.

Moreover, depending on e.g. the quality of the underlying medical image, even skilled physicians may have difficulties with manually determining reference points within the multi-dimensional digital representations. For example, in order to measure a distance between two structures of interest, it has to be determined where either structure begins and ends. This is made more difficult still by the human mind being ill suited for complex three-dimensional considerations including rotations and translations of internal cross-sections that are not experienced by the human mind in the real world and to which the human brain has therefore not adapted by evolution.

Currently available products, methods and programs for determining structures within human internal organs are therefore often difficult and confusing to use, and do not take into account the evolved neural image processing of the human brain.

SUMMARY OF THE INVENTION

It is therefore one of the objects of the invention to provide a solution to the above described problems and in particular to provide methods and systems for precisely and easily and/or automatically generate a digital representation of an annulus structure of a valve from, or in, a segmented digital representation of a human internal organ.

According to a first aspect, the present invention provides a method for generating a digital representation of an annulus structure of a valve from (or: in) a segmented digital representation of a human internal organ, comprising the steps of:

a) providing an input segmented digital representation of at least a portion of a human internal organ comprising an annulus structure of a valve, wherein the digital representation comprises, and/or is based on, image data for three spatial dimensions for each of at least one effective time point;

b) automatically determining, for at least a first effective time point, based on the segmentation (in particular: on the labels) of the provided input segmented digital representation, a candidate plane, or a candidate orientation vector together with a candidate center point, arranged with respect to the input segmented digital representation for the first effective time point;

c) optionally determining a plurality of selecting cross-sections of the input segmented digital representation at the first effective time point, wherein the selecting cross-sections are arranged essentially orthogonally to the candidate plane and/or essentially comprise the candidate center point and the candidate orientation vector;

d) manually or, preferably, automatically, determining a plurality of candidate points (in particular based on the input segmented digital representation) for the annulus structure at the first effective time point;

e) automatically generating a candidate spline interpolation for the first effective time point using the determined candidate points as support points;

f) automatically adapting the candidate spline interpolation for the first effective time point based on the input segmented digital representation; and g) generating a digital representation of the annulus structure at the first effective time point based on the adapted candidate spline interpolation.

The optional step c) of determining the plurality of selecting cross-sections can be omitted when steps b) and d) through g) are (as is preferred) performed automatically. Step c) is especially advantageous in case that step d) is performed manually.

Thus, step d) may comprise manually determining the plurality of candidate points within the selecting cross-sections. However, also step c) may be performed automatically, and step d) may comprise automatically determining the plurality of candidate points within the automatically determined selecting cross-sections. In this context, "manually" may be understood to be the antonym to "automatically", wherein "manually" may relate to semi-automatic or computer-assisted method steps, but may also in other embodiments relate to steps performed completely manually. In other words, performing any step "manually" may mean that some kind of user interaction is necessary, either for the complete step or for parts of the step or even only for confirming the step as a final action.

In the following, whenever mention of one or more selecting cross-sections is made, it shall be understood that the selecting cross-sections are optional and may be determined preferably if the candidate points are to be determined manually but may also be determined if the candidate points are to be determined automatically.

The term annulus structure shall comprise in particular an anatomically distinct annulus tissue structure of the valve, or a portion of the human internal organ that is considered to be an annulus of the valve or that has or provides annulus-like properties for the valve. For example, in the case of the tricuspid valve of the human heart, the geometric area in which the leaflets of the tricuspid valve are attached is often characterized as its annulus. Procedures such as the Tricuspid Valve Supra-annular Implantation (TVSI), Transcatheter Tricuspid Valve Annuloplasty or Transcatheter Tricuspid Valve Repair are named and/or devised accordingly. The present invention advantageously provides the determination of an annulus structure in an easy and preferably automatic way.

In the present context, a "digital representation" should be understood to comprise digitally reconstructed surfaces, digital voxel objects and/or the like. Providing the input segmented digital representation may comprise first transforming one type of digital representation (original digital representation) into another type. For example, a series of 2-dimensional slices (such as from a multi-slice CT) may be transformed into a voxel object by transforming each pixel extending in an x direction and a y direction in the original digital representation into a voxel which has the same value as the pixel but which also extends in a z direction which forms an orthogonal coordinate system tripod with the x direction and the y direction. Original 2-dimensional slices may themselves be reconstructions, i.e. comprise interpolations.

The digital representations may be three-dimensional with three spatial dimensions or four-dimensional with three spatial and one temporal dimension. The temporal dimension of the digital representations is usually made up of effective time points instead of real-world time points, as will be explained in the following.

Medical images, especially three-dimensional images, are generally produced not as a one-time snapshot of a human internal organ, but in a series of "slices" which together make up one "scan". These slices are often acquired sequentially but on a timescale that is much shorter than timescales relating to anatomic activities such as muscle contraction, valve opening/closing and so on. Thus, one three-dimensional image of a particular human internal organ is usually made of slices produced each at a different real time point but aggregated together such as to form the three-dimensional image of that particular human internal organ at an effective time point, i.e. as a time point on a time scale relevant for a diagnostic or therapeutic task.

For example, a three-dimensional image of a human heart may be provided for (or: at) an effective time point of the cardiac cycle. The cardiac cycle can be expressed in the stages of 1) Isovolumic relaxation, 2a) Inflow—ventricular filling, 2b) Inflow—ventricular filling with atrial systole, 3) Isovolumic contraction and 4) Ejection, wherein stages 1), 2a) and 2b) are jointly designated as "systole" or "systolic phase", and wherein stages 3) and 4) are jointly designated as "diastole" or "diastolic phase".

An effective time point with regard to the cardiac cycle may thus be expressed in a time measurement unit (such as seconds or milliseconds) but may also be expressed in a measurement unit relative to the duration of the cardiac cycle, for example 10% (or 30%, or 50%, etc.) along the cardiac cycle, e.g. starting with the systolic phase.

When a plurality of effective time points is mentioned with regard to a cardiac cycle (i.e. with regard to a heart valve), it is preferable that at least one effective time point of the plurality of effective time points is part of the systolic phase and that at least one other effective time point of the plurality of effective time points is part of the diastolic phase. This presents a user efficiently with a wide range of information about the complete cardiac cycle of a particular heart.

More preferably, at least one effective time point is an effective time point of maximum deviation from a rest position of the annulus structure to be determined and/or of the rest position of the annulus structure. For example, one effective time point of maximum deviation could be an effective time point of minimum circumference (e.g. of maximum contraction) of the annulus structure, and/or one effective time point of maximum deviation could be an effective time point of maximum circumference of the annulus structure (e.g. of being maximally stretched, or of being completely relaxed, depending on the anatomical properties of the annulus structure).

For valves other than heart valves, other cycles or time frames may be relevant other than the cardiac cycle.

The term "first" effective time point should not be understood to mean only the earliest time point in the at least one effective time point of a 4-dimensional input segmented digital representation, although the first effective time point may be the earliest time point. However, "first" in the present context may be used only as a label such that the "first effective time point" may well be, as described in the foregoing, an effective time point at any meaningful stage of the valve in question.

In the present context, "segmented" means that, for at least a portion of the digital representation, labels are provided which indicate that this particular portion has specific properties and/or belongs to a specific anatomic structure (and/or belongs to a specific anatomic region). Such specific properties comprise, for example, physical properties such as elasticity, medical properties such as being especially sensible or as being critical and so on. Labels indicating a belonging to a specific anatomic structure may comprise, for example when the human internal organ is a human heart (optionally including at least one blood vessel for transporting blood to or from the heart), indicating a belonging to a particular portion or anatomical structure of the human heart such as particular muscle tissue and/or a particular blood-carrying structure, for example: indicating a belonging to a particular heart chamber (a particular ventricle and/or a particular atrium), to a particular blood vessel, to a particular node and/or to any other particular region of the heart.

The labels may be integrated into the image data structure of the digital representation itself, i.e. as a parameter value provided for individual voxels, or the labels may be provided separately as a list or look-up table. The digital representation may also comprise labels that are implemented as a plurality of masks for the at least one effective time point, wherein each mask corresponds to a specific portion of the human internal organ at a corresponding effective time point.

For example, masks may be defined for a voxel structure (as digital representation) and have values of TRUE and FALSE for each voxel of the voxel structure, wherein a value of TRUE for a voxel indicates that said voxel belongs to the specific portion to which the mask corresponds and a value of FALSE for a voxel indicates that said voxel does not belong to the specific portion to which the mask corresponds. As a specific example, a mask for a left atrium (or right atrium) and a mask for a left ventricle (or right ventricle) may be defined. These masks, together with, or without the voxel structure then form one possible type of a segmented digital representation which includes, or respectively is based on, the image data for three spatial dimensions for each effective time point.

Furthermore, the digital representation may also comprise labels that are implemented as a plurality of surfaces, in particular outer contours, for the at least one effective time point, wherein each outer contour corresponds to the outer contour of a specific portion of the human internal organ. An outer contour may be represented by a polygon mesh defined by a collection of vertices, edges and/or faces. These outer contours may be calculated from another type of label, for example, using a marching cubes algorithm.

The term "outer contour" of a structure shall be understood to mean a surface delimiting the structure, regardless of whether said surface is an inward surface (e.g. an inner wall of a heart chamber or blood vessel) or an outward surface (e.g. an outer wall of a heart chamber or blood vessel). Since the present invention focuses primarily on the inward surfaces of blood-carrying structures, the term "outer contour" will in many cases refer to inward surfaces.

The digital representation may comprise and/or is based on image data for three spatial dimensions and for only one effective time point. In that case, the digital representation can be designated as a 3-dimensional digital representation. Alternatively, the digital representation may comprise and/or is based on image data for three spatial dimensions for each of a plurality of effective time points, e.g. as has been described in the foregoing. In that case, the digital representation can be designated as a 4-dimensional digital representation.

The candidate plane is named thus herein because it is preferably chosen such that it already is a candidate for a plane that best fits the (in general not completely planar, i.e. 2-dimensional) annulus structure. The candidate plane therefore represents an approximated orientation of the annulus structure to be determined and/or of its valve.

The candidate plane may be determined as a best-fit plane with respect to one or more portions of the input segmented digital representation. A "best-fit plane", as the term is used herein, in particular refers to a plane that has been determined as a "best fit" to another structure. Any of the known "best fit" algorithms for planes may be used, for example the least-squares regression method, principal component analysis and/or the orthogonal regression method.

In order to determine the candidate plane for the first effective time point t1, two best-fit planes as described in the foregoing may be generated for two effective time points t2, t3 with t2<t1<t3, and the candidate plane for the first effective time point t1 may be set to an average of the generated best-fit planes for the effective time points t2, t3.

The term "plane" as used herein refers to both 2-dimensional objects ("planes" in the strict sense) as well as to 3- or more-dimensional objects ("hyperplanes"), although in most instances 2-dimensional planes are preferred. However, in some embodiments, e.g. when the input segmented digital representation is 4-dimensional, then also the candidate plane may be a hyperplane in the sense that it may also comprise a time dimension along which multiple effective time points are arranged.

When the human internal organ is a human heart, in some advantageous embodiments, the candidate plane is a so-called short-axis plane and/or the respective cross-sectional view is a so called short-axis view and/or a so-called en-face-view. Further details and options for an optimal choice for the candidate plane will be discussed in the following.

It has been described that the candidate plane functions as an approximation to the annulus structure to be determined and/or to its valve. The same information may also be provided by determining a candidate orientation vector and a candidate center point for the annulus structure. This is immediately evident: the orientation of the candidate plane can be described by its normal vector which represents an orientation vector, and the position of the candidate plane can then be fixed by a single point, for which the candidate center point of the annulus structure is a suitable choice. The candidate center point may also be used as point of origin (or end point) of the candidate orientation vector. In some advantageous embodiments, the candidate plane and the candidate center point are both determined, as will be described in the following.

The candidate plane (or the candidate orientation vector and the candidate center point) being arranged with respect to the input segmented digital representation for the first effective time point should be understood in particular to mean that said candidate objects share the same coordinate system as the 3-dimensional image data included in the input segmented digital representation, or on which the input segmented digital representation is based, and/or as 3-dimensional structures of the input segmented digital representation itself (e.g. 3-dimensional reconstructed surfaces, preferably outer contours serving as labels).

A candidate orientation vector and a candidate center point can also be determined indirectly, e.g. by determining a candidate cylinder and its position with respect to the input segmented digital representation, wherein e.g. the geometric center of the cylinder represents the candidate center point and the rotational symmetry axis of the cylinder represents the candidate orientation vector.

The candidate plane (and/or the candidate orientation vector and the candidate center point) also serves (or serve) as a reference, and geometrical link, for the optionally determined selecting cross-sections, which are arranged essentially orthogonally (or: perpendicular) to the candidate plane and preferably comprise the candidate center point (and/or, essentially comprise the candidate orientation vector and the candidate center point).

The term "essentially orthogonally" shall be understood to mean that each selecting cross-section deviates by only up to 15° (preferably by only up to 10°, more preferably by only up to 5°) in either direction from being perpendicular to the candidate plane. It is preferred that at least one of the selecting cross-sections is completely perpendicular to the candidate plane, and in especially preferred variants all of the selecting cross-sections are perpendicular to the candidate plane.

The term "essentially comprise" shall be understood to mean that the candidate center point has an orthogonal distance to each selecting cross-section which is less than 10 mm in a 3-dimensional coordinate system with respect to the actual life-sized human internal organ (or less than approximately, or exactly, 30% of a typical average diameter of an annulus structure of the mitral valve, preferably less than 20%, more preferably less than 10%), so that a selecting cross section shall intersect the valve. It is preferred that the candidate center position lies in at least one of the selecting cross-sections, and in especially preferred variants the candidate center position lies in all of the selecting cross-sections.

Using the candidate plane as a common geometrical link between the selecting cross-sections (if they are determined in a particular embodiment) is especially advantageous when at least one of the selecting cross-sections is displayed to a user for him/her to approve, or select, a position of one of the candidate points by way of a user input that is preferably input via a graphical user interface, GUI. All of the selecting cross-sections being orthogonal to the candidate plane then allows the spatial sense, or 3-dimensional visual imagination, of a user to intuitively understand the geometrical relationships between the selecting cross-sections well and therefore prevents the user from becoming confused, or "lost" in the 3-dimensional digital representation. In other words, the evolved 3-dimensional pattern recognition and processing faculties of the human brain are exploited for an improved human-machine interaction.

Since in the present invention the generation of the selecting cross-section is highly standardized and precisely defined, a user will be consistently presented with essentially the same view for all sets of input segmented digital representation for the same human organ. In other words, when the human organ is a human heart, the user will advantageously be consistently presented with the same selecting cross-sections. This has a profound training effect on the brain of the user, since the human brain has evolved to quickly learn from similar patterns. In analogy to the training of an artificial neural network with similar training images, by consistently using the present invention the user will become more and more skilled at reviewing, setting and/or adjusting the candidate points in the selecting cross-section. This results in a steadily improving guided human-machine interaction. Evidently, the selecting cross-sections can thus be omitted in some embodiments when the method is performed mostly or completely automatically. However, in other embodiments, the selecting cross-sections may still be determined and may be used in the following steps even if those are automated. Furthermore, an automatically generated digital representation of the annulus structure can be visualized in such cross-sections allowing the user to review the result, which may have similar advantages as described as described in the foregoing.

Moreover, a set (for the same human internal organ for a plurality of different patients) of the same specific selecting cross-section with the candidate points after setting/review/adjustment by the user may be used to train a respective artificial intelligence entity (e.g. a respective artificial neural network) for automatically determining the candidate points in said specific selecting cross-section. The trained artificial intelligence entities may be used e.g. for providing suggested candidate points to the user as will be described in the following.

The candidate points are designated as such because they represent support points for the candidate spline interpolation to be generated and, at the same time, function as candidates for points of the digital representation of the annulus structure to be generated based on the candidate spline interpolation. Supports points should be understood to be points between which spline elements of a spline interpolation are arranged (or: extend). The candidate spline interpolation based on the candidate points is preferably a closed-ring spline interpolation (i.e. it has the form of a deformed ring).

It has been found by the inventors that a surprisingly low number of candidate points and/or selecting cross-sections is sufficient to produce excellent results, which is especially advantageous when the candidate points are determined, or adjusted, manually by one or more users. The number of candidate points that are manually set or reviewed by a user is preferably in the range of 0 to 8 (both included) or 4 to 8 (both included). The number of selecting cross-sections to be visualized and displayed to a user is preferably in the range of 0 to 4 (both included) or 2 to 4 (both included). In embodiments where the number of candidate points to be manually set or reviewed by the user is 0, the user may be provided with the adapted candidate spline interpolation for review and manual adjustment if necessary. In some advantageous embodiments, a quality of the candidate spline interpolation and/or the adapted candidate spline may be automatically determined, and based on the determined quality it may be automatically decided with how many candidate points the user is provided for review and manual adjustment (if necessary) and if necessary steps d) to f) will be performed again.

The generated digital representation of the annulus structure is preferably a 3-dimensional digital representation, for example another closed-ring spline interpolation which is designated as an "adapted candidate spline interpolation" which may, in some embodiments, also be designated as an "output spline interpolation" or a "final spline interpolation". Generating the digital representation of the annulus structure may comprise generating a 4-dimensional digital representation of the annulus structure which consists of a plurality of 3-dimensional digital representations each for a different effective time point. The generated digital representation of the annulus structure may also be generated as a 3-dimensional structure having a volume, e.g. further based on known actual or average dimensions of the annulus structure that are applied to the adapted candidate spline interpolation.

In some advantageous embodiments, in an intermediate step the candidate spline interpolation is used to generate additional support points (in addition to the candidate points) along the candidate spline interpolation, preferably between 10 and 80 additional support points, more preferably between 20 and 50 additional support points.

In some advantageous embodiments, automatically adapting the candidate spline interpolation comprises changing the position of at least one of the candidate points and/or of the generated additional support points based on the input digital representation. In particular, a position of at least one of said points may be changed such as to coincide with a surface, preferably an outer contour, of a blood-carrying structure according to the input digital representation, e.g. an inward surface of a heart chamber or blood vessel.

For example, the input digital representation may comprise a 3-dimensional surface (preferably an outer contour) of at least one blood-carrying structure of the human internal organ (e.g. at least one blood vessel and/or at least one heart chamber of the human heart), in particular in the area of the annulus structure, or a surface reconstruction (e.g. by a polygon mesh) of at least one 3-dimensional surface (preferably an outer contour) of at least one blood-carrying portion of the human internal organ may be generated from (i.e. based on) the input digital representation. Since annulus structures in general are present at a border of two structures, it is preferred that the input digital representation comprises 3-dimensional surfaces for at least two blood-carrying structures adjacent (preferably on either side) to the annulus structure to be determined.

For instance, when the input segmented digital representation comprises a 3-dimensional blood volume but not a surrounding surface of the blood-carrying structure containing said blood volume, either the surface of said blood volume may be used as surface of the blood-carrying structure, or the surface of said blood volume may be inflated by a preset increase factor and then be used as surface of the blood-carrying structure, or a surface having constant distance (wall thickness) around the surface of the blood volume is generated and used as the surface of the blood-carrying structure, or the surface of surrounding tissue is used as the surface of the blood-carrying structure.

In some advantageous embodiments, all of the candidate points and/or all of the generated additional support points are automatically checked as to whether they coincide with the surface of the blood-carrying structure and their position is shifted to the surface of the blood-carrying structure in each case in which that has been found to be not the case. In particular, each point may be shifted automatically to the surface or a point of the surface of the blood-carrying structure to which that point has the minimum 3-dimensional distance. Points of the surface may be represented in a discrete way, e.g. by vertices if the surface/outer contour is represented by a polygon mesh.

In some advantageous embodiments, in particular in embodiments where a user has provided a user input regarding a candidate point, at least the candidate points to which the user has provided the user input are not shifted automatically, the reason being that it is expected that the user is a skilled physician or medical technician and therefore should be allowed and able to fixedly set the position of the candidate points. In some variants, a user input may be required for each candidate point to which the user has provided input and which does not coincide with the surface of the blood-carrying structure; the user may then either indicate their agreement, following which said candidate point is shifted automatically towards the surface of the blood-carrying structure, or the user may indicate their disagreement, following which said candidate point is not shifted automatically.

In any case, a 3-dimensional digital representation of the surface of at least one blood-carrying structure as well as of at least the candidate points (and possibly additionally the generated additional support points) and/or the adapted candidate spline interpolation may be provided to the user, and the user may, in some advantageous embodiments, be provided with the opportunity, via a graphical user interface, GUI, to manually shift any of the displayed support points, e.g. using a touchscreen or a computer mouse and/or the like.

According to a second aspect, the invention provides a use of a generated digital representation of the annulus structure generated using the method according to the first aspect for training an artificial intelligence entity, in particular an artificial intelligence entity for generating a segmented digital representation of at least a portion of a human internal organ. Preferably, said generated segmented digital representation is then used as an input segmented digital representation for the method according to the first aspect in order to obtain an even more accurate digital representation of the annulus structure.

According to a third aspect, the invention provides a system for generating a digital representation of an annulus structure of a valve from, or in, a segmented digital representation of a human internal organ, comprising a computing device configured to perform the method according to the first aspect.

The computing device may be realized as any device, or any means, for computing, in particular for executing a software, an app, or an algorithm. For example, the computing device may comprise a central processing unit (CPU) and a memory operatively connected to the CPU. The computing device may also comprise an array of CPUs, an array of graphical processing units (GPUs), at least one application-specific integrated circuit (ASIC), at least one field-programmable gate array, or any combination of the foregoing.

Some, or even all, modules of the system may be implemented by a cloud computing platform. The computing device may be configured as a cloud computing platform or a remote server which is operatively remotely connected to a graphical user interface (GUI) configured to display information to a user and to receive user input from the user. For example, the GUI may be run on a local machine in a hospital environment while at least some of the computing power is provided by a remotely connected server or cloud computing platform.

According to a fourth aspect, the invention provides a non-transitory computer-readable data storage medium comprising executable program code configured to, when executed, perform the method according to the first aspect. The data storage medium may consist of, or comprise, a CD-ROM, a memory stick, a USB stick, a hard drive, a solid-state data storage device, a DVD, a BluRay-disc, an/or the like.

According to a fifth aspect, the invention provides a computer program product comprising executable program code configured to, when executed, perform the method according to the first aspect.

According to a sixth aspect, the invention provides a data stream comprising, or configured to generate, executable program code configured to, when executed, perform the method according to the first aspect.

Further advantageous embodiments and variants are disclosed in the following, in particular in the dependent claims as well as in the drawings and the corresponding sections of the description.

In some advantageous embodiments, the candidate plane and/or the candidate center position is automatically determined using a support vector machine. Support vector machines are powerful tools for determining border surfaces between different populations. By treating differently labelled points (e.g. vertices) of the input segmented digital representation as different populations, support vector machines have been found to produce excellent candidate planes.

In some advantageous embodiments, the determining of the plurality of candidate points comprises, when steps such as step d) are to be performed manually or mostly manually: displaying a first cross-sectional view (and/or 3-dimensional view) of a first selecting cross-section to a user; receiving a user input relating to the placement of at least one candidate point within the first selecting cross-section; and determining the at least one candidate point to which the received user input related based on the related received user input. This allows e.g. a skilled physician or medical technician to input their user input which indicates where at least one candidate point should be located with respect to the first selecting cross-section. Preferably, the same steps are performed for any or all of any selecting cross-sections determined in addition to the first selecting cross-section.

In some advantageous embodiments, variants, or refinements of embodiments, the determining of the plurality of candidate points comprises: determining a plurality of selecting cross-sections with respect to the input segmented digital representation at the first effective time point, wherein the selecting cross-sections are arranged essentially orthogonally to the candidate plane and/or essentially comprise the candidate center point and the candidate orientation vector. In the selecting cross-sections, suggested candidate points may then be determined automatically.

In some advantageous embodiments, the method further comprises the steps of: automatically determining a suggested candidate point;
displaying the at least one suggested candidate point with respect to at least a portion of the input segmented digital representation (e.g. a cross-sectional view of a selecting cross-section, or a 3-dimensional view including the annulus structure to be determined);
receiving a user input indicating agreement of the user with at least one automatically suggested candidate point, and setting, in response to the user input, all suggested candidate points to which the user has indicated agreement as candidate points. In other embodiments, the automatically determined suggested candidate point is immediately set as one of the candidate points. In other words, in some embodiments the confirmation (or agreement) of the user indicated by the user input may be omitted. In still other words, whenever "suggested" candidate points are mentioned, in some embodiments these are then automatically used as candidate points (without them being suggested to a user for confirmation or rejection first or at any time).

The at least one suggested candidate point may be displayed within a corresponding selecting cross-section and/or within a 3-dimensional view including the annulus structure to be determined.

In this way, for example when the input segmented digital representation is of high quality and the suggested candidate points are already optimal, the user may only indicate agreement, saving valuable time and effort. In such cases (which may e.g. be determined automatically by an automatic quality measurement module evaluating the input segmented digital representation), in some embodiments a graphical user interface may skip displaying any or all of the selecting cross-sections and may display to the user immediately the 3-dimensional view with all of the suggested candidate points (optionally together with the candidate spline interpolation), to which the user may indicate agreement with a single input, such as a click or tap on an "approve" or "next step" button.

The graphical user interface may also present the user with the option to choose any of the suggested candidate points and/or support points and to then be presented with the corresponding selecting cross-section in which they have been determined. The user may then perform an in-detail review of the location of the corresponding suggested candidate point and/or support point and may approve or adjust said location.

In some advantageous embodiments, the method comprises:
automatically determining a suggested candidate point;
displaying the at least one suggested candidate point with respect to at least a portion of the input segmented digital representation;
receiving a user input indicating an amended position for at least one of the at least one suggested candidate points; and
setting, in response to the user input, all amended positions according to the user input as candidate points, respectively.

The at least one suggested candidate point may be displayed within a corresponding selecting cross-section and/or within a 3-dimensional view including the annulus structure to be determined.

In some advantageous embodiments, the method comprises:
displaying a 3-dimensional view, including the annulus structure to be determined, based on the input segmented digital representation;
receiving a user input regarding the placement of at least one candidate point with respect to the provided 3-dimensional view;
wherein the generating of the candidate spline interpolation includes using the at least one candidate point according to that user input as a support point.

Preferably, the candidate spline interpolation is also displayed in the same 3-dimensional view and is adapted in real-time to any changes the user input effects. In this way, users may immediately grasp the consequences of their changes to the candidate spline interpolation.

In some advantageous embodiments, the method comprises the step of providing a view of at least a portion of the input segmented digital representation, in particular of its 3-dimensional image data, in the candidate plane at the first effective time point and displaying at least one of the candidate points arranged therein and/or displaying at least one of the candidate points projected into the candidate plane. Preferably, all of the candidate points are displayed. In this way, a user may review the locations of the candidate points with respect to the candidate plane.

Candidate points projected into the candidate plane may be displayed differently than the candidate plane comprised in the candidate plane, e.g. in a way that indicates their orthogonal distance from the candidate plane (by adding corresponding number, by displaying the points in colors depending on the distance and/or the like).

In some advantageous embodiments, the human internal organ is a human heart and the annulus structure to be determined belongs to a first valve of the human heart. Then, a candidate center position of a second valve of the human heart may be automatically determined; and at least one selecting cross section is automatically determined as a plane which intersects the automatically determined candidate center point of the second valve.

In some advantageous embodiments, the human internal organ is a human heart and the valve is a tricuspid valve. Then, the candidate plane (which may be optionally defined by the candidate orientation vector as its normal vector starting from, or ending in, the candidate center point) may be determined as a plane which best separates a right atrium and a right ventricle in the provided input digital representation of the human heart and/or as a best-fit plane which best fits (or: approximates) a plane in which the Right Coronary Artery and/or the Coronary Sulcus is mostly positioned (or: arranged). Both variants have been found by the inventors to surprisingly be reliable ways to determine suitable candidate planes without human intervention, i.e. of solving a complex 3-dimensional problem that the human mind would not be able to handle comparably.

In some advantageous embodiments, the human internal organ is a human heart and the valve is a mitral valve. Then, the candidate plane (which may be optionally defined by the candidate orientation vector as its normal vector starting from, or ending in, the candidate center point) may be determined as a plane which best separates a left atrium and a left ventricle in the provided digital representation of the human heart and/or by a best-fit plane which best fits (or: approximates) a plane in which the Coronary Sinus and/or the Circumflex Branch of the Left Coronary Artery and/or the Coronary Sulcus is mostly positioned (or: arranged). All of these variants have been found by the inventors to surprisingly be reliable ways to determine suitable candidate planes without human intervention, i.e. of solving a complex 3-dimensional problem that the human mind would not be able to handle comparably.

In some advantageous embodiments, providing the input digital representation comprises providing a preliminary digital representation comprising a digital representation of at least one blood volume; and the method further comprises the steps of:

determining an outer contour of the digital representation of the at least one blood volume; and providing the input digital representation based on (preferably including or consisting of) the determined outer contour.

In this way, segmented digital representations relating to blood volumes (such as from CT medical imaging) may be easily and reliably translated—completely or partially—into segmented digital representations relating to blood-carrying structures.

In some advantageous embodiments, step g) comprises generating a 3-dimensional digital representation of the annulus structure for the first effective time point;

wherein the adapted candidate spline interpolation for the first effective time point is modified based on properties of the segmented digital representation regarding at least one second effective time point in order to generate a respective candidate spline interpolation for the at least one second effective time point; and wherein a 3-dimensional digital representation of the annulus structure for the at least one second effective time point is provided based on the generated adapted candidate spline interpolation for the at least one second effective time point, the method comprising the further step:

generating a 4-dimensional digital representation of the annulus structure based at least on the 3-dimensional digital representations of the annulus structure for the first effective time point and for the at least one second effective time point.

This provides an easy yet precise way of constructing a 4-dimensional digital representation of the annulus structure which yields valuable insights into the behaviour and geometrical variation over time of the annulus structure.

In some advantageous embodiments, step g) comprises generating a 3-dimensional digital representation of the annulus structure for the first effective time point;

wherein steps b) to g) are performed for at least one third effective time point, the method comprising the further step:

generating a 4-dimensional digital representation of the annulus structure based on at least the 3-dimensional digital representations of the annulus structure for the first effective time point and for the at least one third effective time point.

This provides an easy yet precise way of constructing a 4-dimensional digital representation of the annulus structure based on simple guided selections performed by the user in 2- and/or 3-dimensional view to which the human brain is well adapted.

In some advantageous embodiments, the method comprises:

determining a best-fit plane for the generated digital representation (in particular 3-dimensional digital representation or 4-dimensional digital representation) of the annulus structure for at least the first effective time point; and generating a 2-dimensional digital representation or projection of the annulus structure at the first effective time point in the determined best-fit plane. For many medical applications and diagnostic tasks such as determining appropriate implant types, 2-dimensional digital representations are useful. Additionally or alternatively, from a generated 4-dimensional digital representation of the annulus structure, a time-dependent 2-dimensional digital representation or projection of the annulus structure is generated, e.g. a video of the two-dimensional projection of the generated digital representation of the annulus structure as a function moving over the course of effective time points.

In some advantageous embodiments, the method comprises:

determining a position and orientation of the generated digital representation of the annulus structure with respect to the input segmented digital representation, in particular with respect to the 3-dimensional input segmented digital representation; and determining at least one distance from at least one point of the generated digital representation of the annulus structure to at least one portion of the input segmented digital representation (in particular of the 3-dimensional image data), or to another point of the generated digital representation of the annulus structures, at (or for) at least one effective time point.

In this way, valuable information about the 3-dimensional properties of the annulus structure may be used to determine parameters for medical applications and diagnostic tasks such as determining appropriate implant types or determining a risk of a certain medical procedure. The determined at least one distance may be automatically compared to a pre-determined threshold value, and a warning signal may be output to a user by a user interface when the threshold is crossed in an undesired direction (exceeded in case of an upper threshold or undercut in case of a lower threshold). For each distance to be determined a corresponding threshold value may be provided. The threshold values preferably depend on an intended medical procedure or diagnostic task. A diagnostic recommendation may be automatically determined and output in a recommendation signal based on all of the determined distances and their corresponding threshold values. The warning signal and/or the recommendation signal may be output optically, acoustically and/or haptically.

In especially preferred embodiments, the method allows to automatically generate a digital representation of an annulus structure of a valve in a segmented digital representation of a human internal organ, with the following steps:

a) providing an input segmented digital representation of at least a portion of a human internal organ comprising an annulus structure of a valve, wherein the digital representation comprises, and/or is based on, image data for three spatial dimensions for each of at least one effective time point;

b) automatically determining, for at least a first effective time point, based on the segmentation (in particular: on the labels) of the provided input segmented digital representation, a candidate plane, or a candidate orientation vector together with a candidate center point, arranged with respect to the input segmented digital representation for the first effective time point;

d) automatically determining a plurality of candidate points for the annulus structure at the first effective time point based on the input segmented digital representation;

e) automatically generating a candidate spline interpolation for the first effective time point using the determined candidate points as support points;

f) automatically adapting the candidate spline interpolation for the first effective time point based on the input segmented digital representation; and g) generating a digital representation of the annulus structure at the first effective time point based on the adapted candidate spline interpolation.

Also in especially preferred embodiments, a 4-dimensional digital representation of the annulus structure based on at least the 3-dimensional digital representations of the annulus structure for at least three, more preferably for at least five effective time points is generated to represent the dynamics of the annulus structure. The 4-dimensional digital representation may be smoothed out based on its 3-dimensional digital representations of the annulus structure, thus each of the 3-dimensional digital representations may be adjusted for smoother transitions between effective time points.

Optionally, a Kalman filter or Moving Average can be used to adjust each of the 3-dimensional digital representations of the other annulus structures to achieve a "smooth" systematic 4-dimensional digital representation of the annulus structure.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
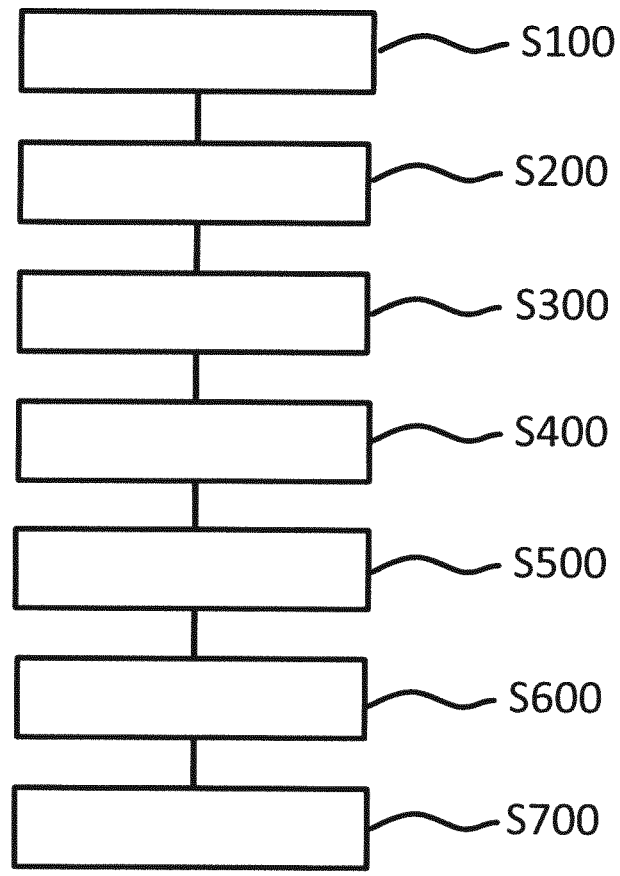
FIG. 1 shows a schematic flow diagram illustrating a method according to an embodiment of the first aspect of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION OF THE INVENTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 shows a schematic flow diagram illustrating a method for generating a digital representation of an annulus structure in, or of, a valve from a segmented digital representation of a human internal organ according to an embodiment of the first aspect of the invention.

The method according to FIG. 1 will be explained in detail using two specific examples: first, determining the annulus structure of a tricuspid valve of a human heart (i.e. generating a digital representation of the annulus structure of the tricuspid valve) and second, determining the annulus of a mitral valve of a human heart (i.e. generating a digital representation of the annulus of the mitral valve).

It should be understood that all of the method steps, if they do not explicitly relate to a user input or the like, are advantageously performed automatically, for example by a system according to the third aspect of the present invention. Specifically, the method may be performed by a program code executed by a computing device (e.g. a cloud computing platform and/or a local computer), wherein steps that relate to a display of information may be performed by a display device configured to show a graphical user interface, GUI, according to instructions from the computing device and wherein steps that relate to a user input may be performed (or assisted) by a user interface which may be operatively connected to the computing device, the display device and/or the GUI.

The tricuspid valve, or right atrioventricular valve, is a valve of the human heart on the right dorsal side of the mammalian heart, between the right atrium and the right ventricle. The tricuspid valve annulus is less fibrous than other annuli and slightly larger than the mitral valve annulus. It is sometimes defined as a hinge area along which the three leaflets of the tricuspid valve are hingedly attached.

The mitral valve, also known as the bicuspid valve or left atrioventricular valve, is a valve with two flaps in the mammalian heart, that lies between the left atrium and the left ventricle. The mitral valve annulus constitutes the anatomical junction between the ventricle and the left atrium, and serves as an insertion site (or: hinge area) for the leaflet tissue.

In a step S100 of the method, an input segmented digital representation of at least a portion of a human internal organ comprising an annulus structure of a valve is provided. The digital representation comprises, or is based on, image data for three spatial dimensions for each of at least one effective time point.

The input segmented digital representation may comprise labels integrated into the image data structure of the digital representation itself, i.e. as a parameter value provided for individual voxels, or the labels may be provided separately to the image data structure of the digital representation of the human internal organ as a list or look-up table. The digital representation may also comprise a plurality of masks as the labels of its segmentation for the at least one effective time point, as has been described in the foregoing.

The input segmented digital representation may comprise, or consist of, an output of an artificial intelligence entity (for example, an artificial neural network) that has received as its input 3-dimensional or 4-dimensional medical image data.

A 3-dimensional input segmented digital representation may consist of medical image date for three spatial dimensions for one effective time point. A 4-dimensional input segmented digital representation may comprise of such medical image data for three spatial dimensions for each of at least two effective time points such that the fourth ("time") dimension is represented by changes between the at least two effective time points.

In the example of the mitral valve, the segmented digital representation may be a representation of the complete human heart, of a system comprising the human heart and at least one blood vessel leading to or from it (and/or a blood-carrying structure such as the Coronary Sinus), or only of parts of the left atrium and the left ventricle.

In the example of the tricuspid valve, the segmented digital representation may be a representation of the complete human heart, of a system comprising the human heart and at least one blood vessel leading to or from it (and/or a blood-carrying structure such as the Coronary Sinus), or only of parts of the right atrium and the right ventricle.

In a step S200 of the method, for a first effective time point a candidate plane based on the segmentation (in particular: based on the labels) of the provided input segmented digital representation is automatically determined with respect to the 3-dimensional image data of the input segmented digital representation or from which the input segmented digital representation derives. The candidate plane is a 2-dimensional (planar) object arranged in a 3-dimensional spatial coordinate system with respect to the image data for the three spatial dimensions for the first effective time point. As has been described in the foregoing, instead of (or in addition to) the candidate plane, also a candidate orientation vector together with a candidate center point may be determined. The following discussion will focus on the variant using the candidate plane, and determining in addition a candidate center point. However, the variant using the candidate orientation vector and the candidate center point may be implemented alternatively and analogously.

The automatic determining of the candidate plane may, e.g., be based on at least one labelled portion of the input segmented digital representation. That labelled portion may correspond to the annulus structure to be determined and/or to one or more adjacent anatomical structures.

For example, in case of the tricuspid valve, the right coronary artery surrounds the tricuspid valve. The candidate plane may thus be, in case of the tricuspid valve, be determined based on the labelled portion of the input segmented digital representation representing the right coronary artery. For example, a best-fit plane (e.g. using a least-squares regression, principal component analysis and/or orthogonal regression) for a plane in which the Right Coronary Artery is mostly arranged (or: positioned) may be automatically determined and set as the candidate plane.

Similarly, for the mitral valve, a best-fit plane which best fits (or: approximates) a plane in which the Coronary Sinus is mostly positioned (i.e. a best-fit plane for the Coronary Sinus, e.g. determined by the least squares regression, principal component analysis and/or orthogonal regression) and/or a plane in which the Left Circumflex Artery is mostly positioned (or: arranged) may be set as the candidate plane.

Preferably, the candidate plane is determined by a support vector machine trained to best separate (i.e. to separate completely and clearly, if possible, or to separate as good as possible, e.g. using a soft-margin support vector machine) two differently labelled portions of the input segmented digital representation. In case of the tricuspid valve, a support vector machine trained to best separate a right atrium and a right ventricle in the provided input segmented digital representation may be used. In case of the mitral valve, a support vector machine trained to be separate a left atrium and a left ventricle in the provided input segmented digital representation may be used. In the support vector machine, for example a linear kernel (which reduces computing time) or a polynomial kernel (which allows computation in higher-dimensional latent spaces) may be used.

In each case, not necessarily all of the points/information of the labelled portions is/are used; instead, preferably first an automatic selection of points of interest of the labelled portions is performed. The points of interest for a first and a second labelled portion may e.g. be defined as only those points of each of the two labelled structure that lie within a predetermined distance to the other of the two labelled structures. For example, in case of the tricuspid valve, only such points of the image date of the input segmented digital representation may be determined as points of interest which, according to the segmentation (i.e. the labels) of the input segmented digital representation:

a) belong to the right atrium and lie within a predetermined distance to at least one point of the right ventricle;
 or
 b) belong to the right ventricle and lie within a predetermined distance (preferably the same as in a) above) to at least one point of the right atrium.

In the case of an annulus structure of a human heart valve, said predetermined distance may be 10 millimeters or less, preferably 5 millimeters or less, depending e.g. on the resolution of the image data and the available computing power for the method. It should be understood that distances in millimeters refer to the image data being scaled to the actual size of the human internal organ.

In cases where the support vector machine is configured and trained to produce a 2-dimensional surface, the result of the support vector machine may be directly used as the candidate plane. In cases where the support vector machine is configured and trained to produce a 3- or more-dimensional surface, the candidate plane may be automatically determined as a best-fit to said surface, using a best-fit algorithm such as the least-squares regression, principal component analysis, orthogonal regression and/or the like.

As another alternative, for the atrioventricular valves a border surface between two respective heart chambers (left ventricle and left atrium or right ventricle and right atrium) may be determined automatically based on the input segmented digital representation. For example, when both heart chambers are labelled in the input segmented digital representation it is straightforward to automatically determine the border surface where the two differently labelled portions meet. The candidate plane may then be automatically determined as a best-fit to said border surface.

In an optional step S300, a plurality of selecting cross-sections of the input segmented digital representation at the first effective time point is determined. The plurality of selecting cross-section may be determined completely automatically (as will be explained in the following), may be determined completely manually by a user (for example if the user is an extremely skilled physician) or may be determined and suggested automatically, after which a user will have the opportunity to amend at least one of the plurality of selecting cross-sections.

The plurality of selecting cross-section is determined such that all of the selecting cross-sections are arranged essentially (or exactly) orthogonally to the candidate plane.

To determine the exact arrangement of the selecting cross-sections, for each selecting cross-section preferably two points are used that shall be comprised in that selecting cross-section. In some advantageous embodiments, one of the two points for each selecting cross-section is a candidate center point of the annulus structure to be determined. The candidate center point preferably lies within the candidate plane and is a point that approximates a geometric center of the annulus structure to be determined.

The candidate center point may be determined, for example, by projecting the points of interest (as has been described in the foregoing with respect to determining the candidate plane), or a sub-set of those points of interest (for example, such points of the points of interest that have lie within even closer distances to points of the respective other blood-carrying structure adjacent to the annulus structure) into the candidate plane, and then determining the geometric center of the projections of those points to be the candidate center point.

Alternatively, a geometric center of the points of interests (or, as has been described, of the sub-set of the points of interests) may be determined (e.g. in the same way as a center of mass for a cloud of points of equal mass) in three spatial dimensions. That point may in some variants then itself be used as the candidate center point; it will in general not lie in the candidate plane. In other variants, a projection of that point into the candidate plane will be determined and set to be the candidate center point.

After a first selecting cross-section has been determined, a second selecting cross-section may in some advantageous embodiments be determined automatically as a plane that is perpendicular to both the candidate plane and the first selecting cross-section.

With reference to FIGS. 2 to 6, in the following the determining of selecting cross-sections for the determining of the annulus structure of the tricuspid valve will be explained.

Figure 2:
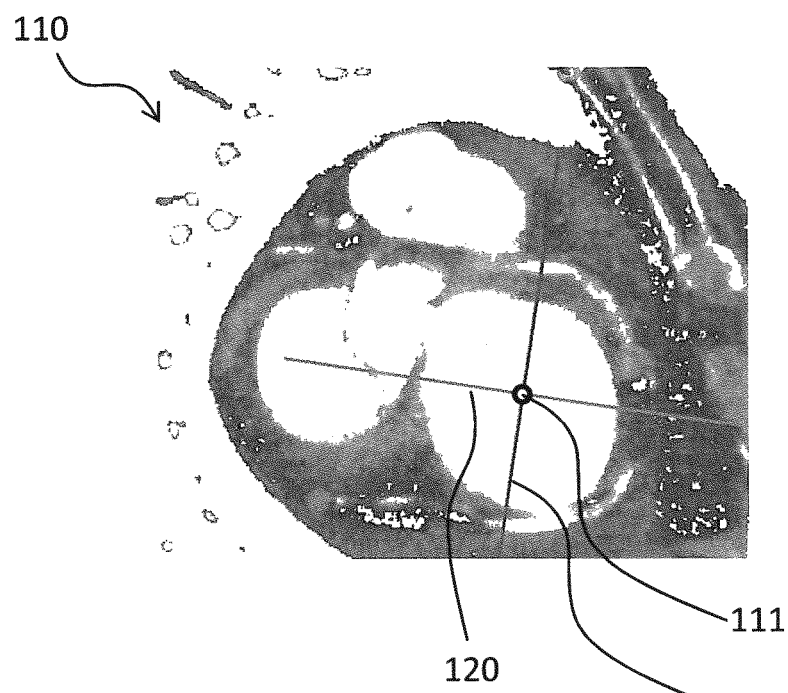
FIG. 2 to FIG. 5 show various cross-sections through 3-dimensional medical image data for illustrating the method according to FIG. 1.

FIG. 2 shows an example of a cross-sectional view of the candidate plane 110 for the case of the tricuspid valve. After the candidate center point 111 for the tricuspid annulus structure is determined as has been described in the foregoing, in the example of FIG. 2 a first selecting cross-section 120 and a second selecting cross-section 130 are automatically determined as will be described in the following.

Figure 3:
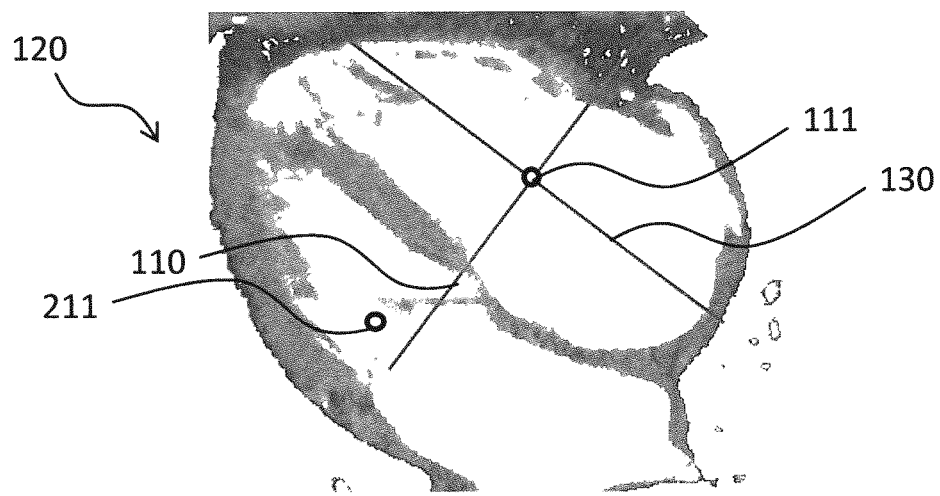

For example, a first selecting cross-section 120 may be a so-called 4-chamber view, as illustrated by FIG. 3. In FIG. 3, both the cross-sectional view of the candidate plane 110 and the second selecting cross-section 130 (to be determined in the following) are illustrated by respective lines. In order to automatically determine the first selecting cross-section 120, a candidate center point 211 for the mitral valve may be automatically determined, e.g. as has been described in the foregoing for the candidate center point 111 of the tricuspid valve. The first selecting cross-section 120 may then be automatically determined such that it comprises the candidate center point 111 for the tricuspid valve and the candidate center point 211 for the mitral valve. The first selecting cross-section 120 will then be a so-called 4-chamber view.

Similarly, in case of the mitral valve, preferably a first selecting cross-section may be determined as essentially (or exactly) orthogonal to the candidate plane for the annulus of the mitral valve and as comprising both the candidate center point 211 for the mitral valve and the candidate center point 111 for the tricuspid valve.

In general it has been found by the inventors that surprisingly, due to the specific anatomic layout of the human heart, it is advantageous that a selecting cross-section for a valve of the human heart is determined by being essentially (or exactly) orthogonal to the candidate plane for that valve and as comprising both the candidate center point for that valve and a candidate center point for one other valve of the human heart. In particular in the case of atrioventricular valves, it has been found by the inventors that one selecting cross-section for any of the two atrioventricular valves (tricuspid or mitral) is preferably determined by being essentially (or exactly) orthogonal to the candidate plane for that atrioventricular valve and as comprising the candidate center points 111, 211 for both atrioventricular valves (tricuspid and mitral).

Figure 4:
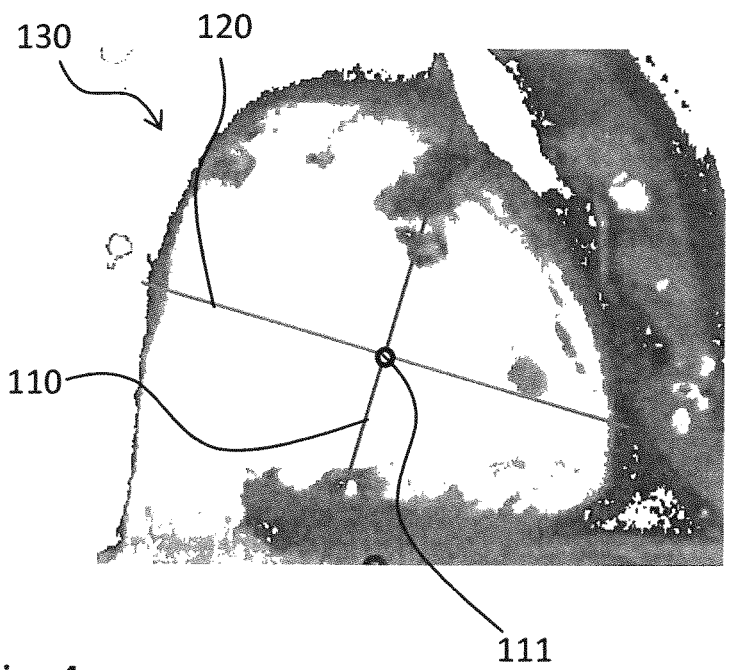

FIG. 4 shows the second selecting cross-section 130, wherein the cross-sectional view 110 and the first selecting cross-section 120 are indicated by respective lines. The second selecting cross-section 130 is preferably determined by being perpendicular to both the candidate plane 110 and the first selecting cross-section 120. In the present example, the view of FIG. 4 is called a 2-chamber view.

In some advantageous embodiments, additional selecting cross-sections are provided, their respective defining points (in addition to the candidate center point for the annulus structure to be determined) being e.g. given by a candidate center point of the aortic valve (or the Aorta Ascendens or the root of the aorta) (in particular in case of the mitral valve), or by a candidate center point of the Coronary Sinus (CS) orifice (in particular in case of the tricuspid valve). Again, such center points may be determined by any of the methods that have been described in the foregoing with respect to the candidate center point for the annulus structures, which may be equally applied to other annulus structures, valves such the aortic valve and to orifices such as the Coronary Sinus orifice.

In case of the mitral valve, the selecting cross-section defined by a candidate center point of the aortic valve is useful to predict a potential obstruction of the left ventricular outflow (LVOT) for an implantation procedure.

In each selecting cross-section, the annulus structure to be determined will intersect the selecting cross-section in two points. Accordingly, each selecting cross-section ideally allows two candidate points for the annulus structure to be determined, as will be discussed in the following. If, for example, it is intended to determine eight candidate points, then four selecting cross-sections will be automatically determined. Since it has been found by the inventors that 4 to 8 candidate points already yield excellent results, at first three selecting cross-sections may be determined. Ideally, this will result in 6 candidate points. A user may, e.g. in a GUI, be given the option to review the results and to command that another selecting cross-section be determined for another at least one candidate points to be determined.

In a step S400, a plurality of candidate points for the annulus structure at the first effective time point are determined, either automatically, manually, or by automatically generating suggested candidate points which may then be individually reviewed and approved or amended by a user via a user input that is preferably input via a GUI. The plurality of candidate points may be determined within one or more selecting cross sections 120, 130, in embodiments where these are determined. In the following, this option will be discussed in more detail; however, it shall be understood that in every described embodiment the method steps may be performed completely automatically.

Figure 5:
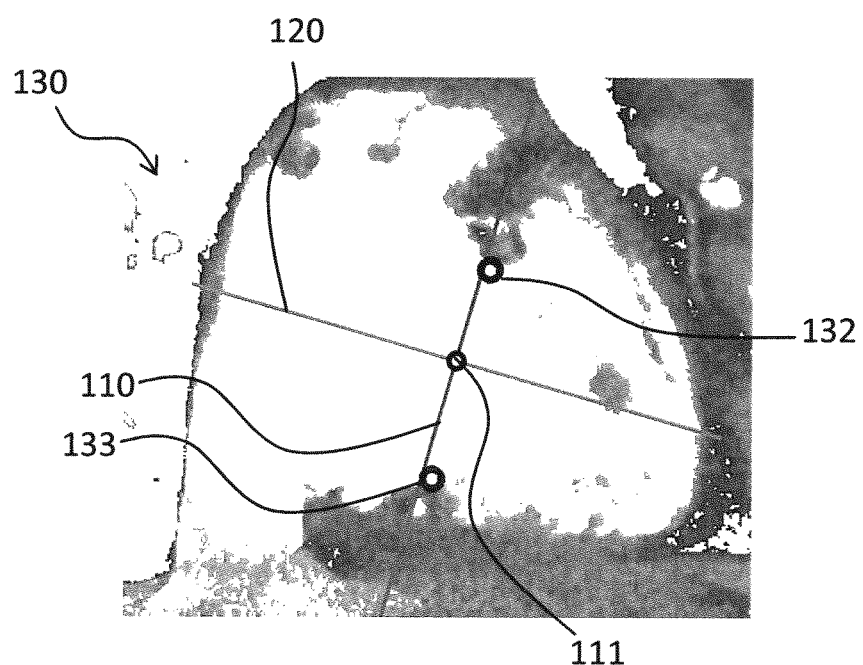

FIG. 5 shows two such automatically suggested candidate points 132, 133 within the second selecting cross-section 130. As has been discussed, in some embodiments, in step S400 optionally a view of at least one selecting cross-section 120, 130 is presented to a user via a GUI, and the user is prompted to select 0, 1 or 2 candidate points within the presented selecting cross-section. The GUI may be implemented by a display device operatively coupled to a computing device.

Users may review e.g. the selecting cross-section 130 and then set the candidate points 132, 133 based on their experience. It should be noted that in FIG. 5 the candidate points 132, 133 do not lie directly on the candidate plane 110. Nevertheless, the graphical depiction of the candidate plane in the view of FIG. 5 may help the user to guide their eye immediately towards the vicinity of the most likely location of the candidate points 132, 133.

As an alternative, the suggested candidate points 132, 133 may be presented to the user automatically with or without the selecting cross-section 130, or the user may have the option to activate or deactivate being shown the suggested candidate points by the GUI.

The suggested candidate points may be determined e.g. as follows: for each of the two blood-carrying structures (e.g. heart chambers) adjacent to the annulus structure to be determined (in the case of the tricuspid valve the right atrium and the right ventricle, in the case of the mitral valve the left atrium and the left ventricle), a 3-dimensional outer contour line (a deformed ring) of the boundary surface between the two blood-carrying structures, here heart chambers, is determined, based on the boundary surface between label portions of the two heart chambers (e.g. a voxel or surface model).

As has been described in the foregoing, such surface models may already be part of the input segmented digital representation or may be automatically generated e.g. from voxel data of blood volumes within the respective heart chambers of the input segmented digital representation. Alternatively, a label for an approximation for the 3-dimensional annulus structure may be part of the input segmented digital representation also leading to a 3-dimensional outer contour line.

This outer contour line will intersect with each selecting cross-section in two points which are then produced as suggested candidate points 132, 133. The user may then approve of them by inputting a user input, e.g. by clicking an "APPROVE" button, by indicating the desire to move on to a next selecting cross-section or to finish approving of suggested candidate points and/or the like. The user may also disapprove of some (or all) of the suggested candidate points, and may in particular be offered, by the GUI, the option to move the suggested candidate points within the selecting cross-sections 120, 130 manually, e.g. by a drag-and-drop method. The GUI may offer the user the option to zoom in and out of the selecting cross-sections in order to even better fix the position for the candidate points 132, 133.

In some embodiments, the suggested candidate points may be automatically set as the candidate points 132, 133 without any user input being necessary. It is also possible that for some selecting cross-sections 120, 130, e.g. where the location of the candidate points is usually clear, the suggested candidate points are automatically set as candidate points 132, 133 and that for other selecting cross-sections 120, 130 the suggested candidate points are provided to a user for review and approval/amendment.

The GUI may in some advantageous embodiments offer the user a simultaneous view of the candidate plane 110 and at least one selecting cross-section 120, 130, preferably of two selecting cross-sections 120, 130 that are perpendicular to each other. In the view of the candidate plane 110 and the selecting cross-sections 120, 130 the respective two other planes 110, 120, 130 are preferably indicated by lines as shown in FIG. 2 to FIG. 4 in order to enable the human brain to correctly process their spatial arrangement with respect to each other.

It is advantageous when all candidate points 132, 133 are shown to the user not only in the selecting cross-sections 120, 130 in which they were determined but also in the view of the candidate plane 110. This allows the 3-dimensional processing of the human brain to intuitively understand their respective positioning. Optionally, all of the candidate points 132, 133 are shown not only in the candidate plane but also in all of the selecting cross-section 120, 130; however, it is preferred that in the selecting cross-sections 120, 130 the candidate points 132, 133 that have been determined for (or: in) that same selecting cross-section 120, 130 are marked differently (e.g. by a larger symbol, or in a different color, or by a different symbol) than the candidate points 132, 133 that have been determined for (or: in) other selecting cross-section 120, 130.

In especially preferred embodiments, the GUI simultaneously also shows, or offers the option to show, a 3-dimensional view of at least the annulus structure to be determined, e.g. based on the input segmented digital representation.

Figure 6:
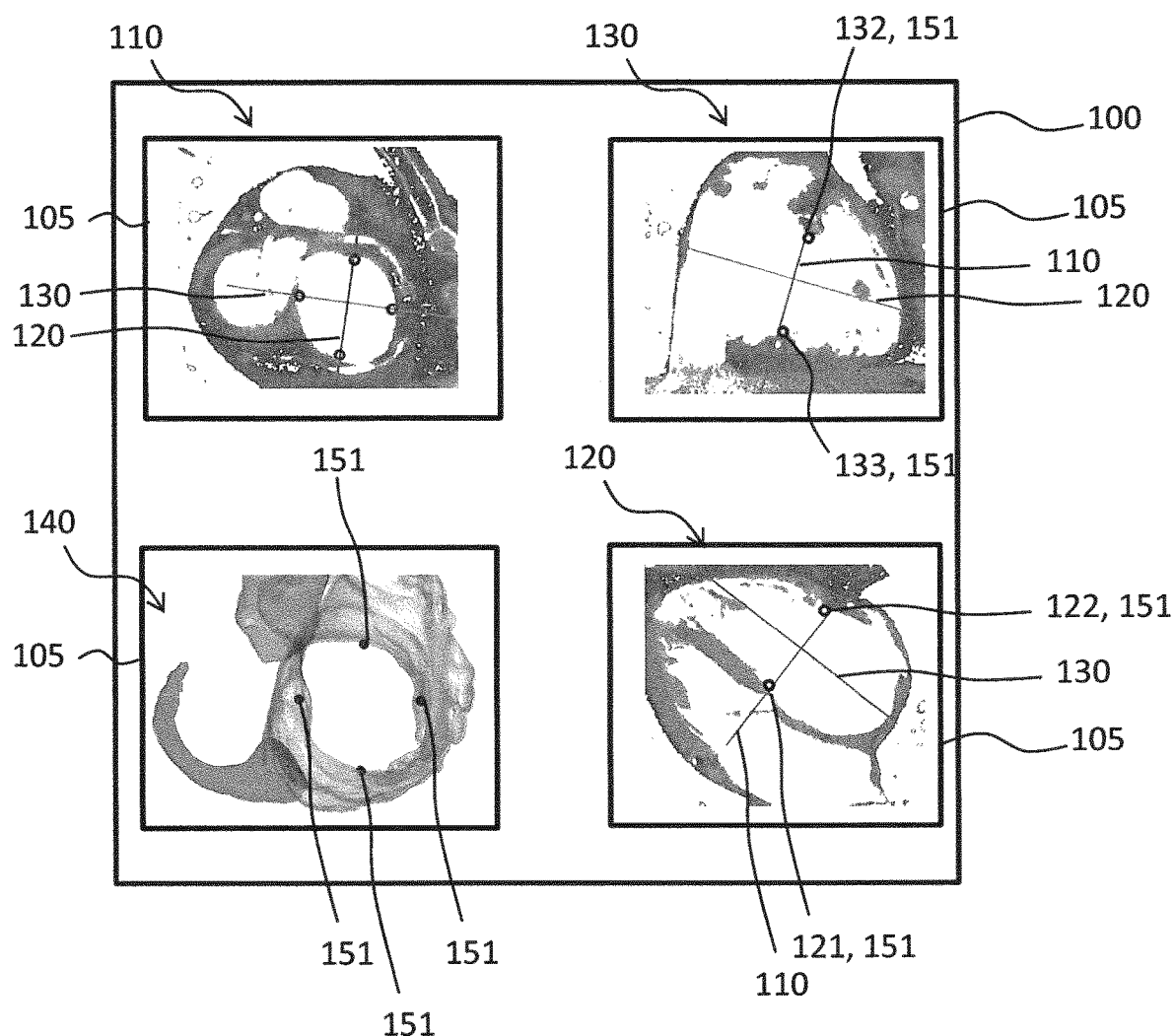
FIG. 6 shows a graphical user interface usable in the method according to FIG. 1.

Such a GUI 100 is schematically shown in FIG. 6. The candidate plane 110 is shown in the upper left corner, the two selecting cross-section 120, 130 on the right-hand side, and the 3-dimensional view 140 in the lower left corner. In the first selecting cross-section 120, candidate points 121, 122 determined in the first selecting cross-section 120 are shown which are, together with the candidate points 132, 133 of the second selecting cross-section 130, shown also both in the view of the candidate plane and in the 3-dimensional view 140. The candidate points 121, 122, 131, 132 will sometimes be collectively labelled as 151 for simplicity in the following. The 3-dimensional view 140 is preferably rotatable by a user, e.g. using a computer mouse or a touch gesture. All of the view in the GUI 100 are updated in real-time so that the user can immediately perceive the effect of moving e.g. candidate point 121 in the first selecting cross-section 120 in all of the other views 110, 130, 140.

This GUI 100 therefore enables the human brain to intuitively grasp and process the spatial relationships of the candidate points 151 to one another and to the annulus structure that is already starting to become apparent to the user in the 3-dimensional view 140.

To enable the human brain to process the complex spatial relationships even faster, a color scheme may be used in which a particular color is associated with each of the candidate plane 110 and the selecting cross-sections 120, 130. The lines drawn in the different view may then be displayed by the GUI in the corresponding color. Optionally, also the candidate points 132, 133 are displayed by the GUI in the color of the selecting cross-section for (or: in) they have been determined.

For example, when the 2-chamber view of FIG. 5 (i.e. the second selecting cross-section 130) is associated with the color green, then the candidate points 132, 133 determined in that second selecting cross-section may be displayed in green by the GUI, either everywhere or at least in the view candidate plane 110 and/or the 3-dimensional view 140.

In this way, when the brain of the user intuitively determines, using its evolved 3-dimensional spatial processing faculties, that e.g. one candidate point 151 is implausible (or when the user determines the same using their trained skills and/or their medical knowledge), the color scheme makes it immediately clear to which selecting cross-section the user has to look in order to fix that candidate point 151. To further enhance this sub-conscious guidance of the human brain in its processing, colored borders 105 according to the respective color scheme may be displayed by the GUI 100. For example, the border 105 around the view of the candidate plane 110 as well as all lines representing the candidate plane 110 in other views may be displayed in blue; the border 105 around the first selecting cross-section 120 as well as all lines representing the first selecting cross-section 120 in other views may be displayed in orange; and the border 105 around the second selecting cross-section 130 as well as all lines representing the second selecting cross-section 130 in other views may be displayed in blue green. Optionally, the same may apply to the respective candidate points 151.

It should be understood that the above-described steps and variants are in no way restricted to the tricuspid valve but also apply to any other valve or valve structure of a human internal organ, wherein in general only the criteria for determining the candidate plane and the selecting cross-sections have to be adapted.

After step S400 as described, a number of candidate points 121, 122, 131, 132 will have been determined, preferably from 5 to 12, more preferably from 5 to 8 candidate points 151.

In a step S500, a candidate spline interpolation for the first effective time point using the determined candidate points as support points is generated. As the candidate spline interpolation is intended to approximate the annulus structure, it is generated as a closed ring. "Closed ring" should be understood to mean not necessarily circle-shaped, which the annulus structure will in general not be in any case, but that the structure is not open-ended. Any of the known methods for producing spline interpolations may be used.

In especially preferred embodiments, the method allows to automatically generate a digital representation of an annulus structure of a valve in a segmented digital representation of a human internal organ, with the following steps:

a) An input segmented digital representation of at least a portion of a human internal organ comprising an annulus structure of a valve is provided, wherein the digital representation comprises, and/or is based on, image data for three spatial dimensions for each of at least one effective time point. This step may be performed as has been described in the foregoing with respect to the step S100.

b) At least a first effective time point, based on the segmentation (in particular: on the labels) of the provided input segmented digital representation, a candidate plane, or a candidate orientation vector together with a candidate center point, arranged with respect to the input segmented digital representation for the first effective time point, are automatically determined. Whenever in the following or in the foregoing the determining of the candidate plane is discussed, it shall be understood that all that is being said may also be applied to the variant wherein a candidate orientation vector together with a candidate center point are determined instead of the candidate plane.

As has been described in the foregoing, the candidate plane may be determined automatically by a support vector machine. Alternatively, the candidate plane may be determined as a best-fit plane with respect to one or more portions of the input segmented digital representation. The one or more portions may be determined prior to the determining of the candidate plane. For example, automatically a border surface where the two differently labelled portions meet may be determined. The candidate plane may then be automatically determined as a best-fit to said border surface.

The candidate plane may specifically be determined based on one or more labelled portions of the input segmented digital representation representing leaflets or the attachment of leaflets.

d) A plurality of candidate points for the annulus structure at the first effective time point is automatically determined.

For example, in addition to what has been described in the foregoing, a 3-dimensional outer contour line (a deformed ring) of the boundary surface between the two blood-carrying structures, e.g. heart chambers, is determined, based on the boundary surface between label portions of the two heart chambers (e.g. a voxel or surface model). This contour line may be directly used as candidate points, or (e.g. equidistant, or even random) candidate points along this contour line may be automatically selected. Such candidate points or contour line may represent directly an orientation and—through their/its center—a position for the candidate plane (e.g. a best-fit plane can be calculated).

Alternatively, the candidate plane may intersect with an outer contour of at least one labelled portion. Some or all of the intersection points are then produced as candidate points.

Still alternatively, when in a step c) selecting cross-sections are determined as has been described in the foregoing, the candidate plane and any of the plurality of selecting cross sections will intersect in a line which may intersect an outer contour (or closely pass its surface points) of at least one labelled portion and produce two candidate points. Such a line can also intersect (or closely pass) at least one labelled portion and two intersecting points are produced as candidate points.

Yet alternatively, when in a step c) selecting cross-sections are determined as has been described in the foregoing, first an automatic selection of points of interest of the labelled portions is performed. The points of interest for a first and a second labelled portion may e.g. be defined as only those points of each of the two labelled structure that lie within a predetermined distance to the other of the two labelled structures. In other words, the points of interest are points on the border between the two labelled portions. From such points within a certain distance to any selecting cross section, two points will be selected to produce two candidate points approximately (or exactly) in the respective selecting cross section.

Still further alternatively, the suggested candidate points may be defined based on all or some points on the border between labelled portions of the input segmented digital representation representing leaflets and labelled portions representing the outer contour of the surrounding blood volume or tissue of the valve.

The candidate points may also be defined on all or some points of a labelled portion of the input segmented digital representation representing the attachment (region) of leaflets.

e) A candidate spline interpolation for the first effective time point using the determined candidate points as support points is generated automatically, e.g. as has been described in the foregoing.

f) The candidate spline interpolation for the first effective time point is adapted automatically based on the input segmented digital representation, e.g. as has been described in the foregoing.

g) A digital representation of the annulus structure at the first effective time point based on the adapted candidate spline interpolation is automatically generated, e.g. as has been described in the foregoing.

In some embodiments, the determining of the candidate plane may even be omitted completely, and candidate points may be determined directly based on the input segmented digital representation, for example as has been described in the foregoing.

Figure 7:
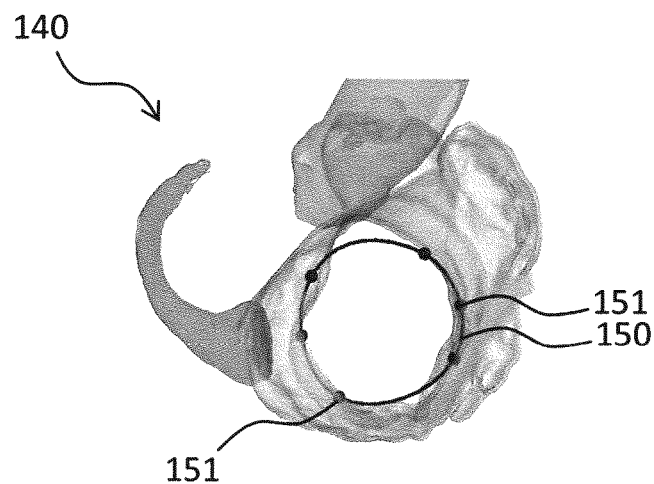
FIG. 7 shows a schematic illustration of a step of the method according to FIG. 1.

FIG. 7 schematically illustrates the 3-dimensional view 140 of the annulus structure in which six candidate points 151 have been displayed and which are connected by a closed-ring-shaped candidate spline interpolation 150. In the example shown in FIG. 7, two additional candidate points 151 compared to the four candidate points shown in FIG. 6 have been added. The two added candidate points 151 may have been determined, either automatically, or manually, or guidedly as described in the foregoing, with respect to a third (and optionally even a fourth) selecting cross-section.

The GUI may be configured to display to the user, automatically or on request, the 3-dimensional view 140 of the annulus structure together with the candidate spline interpolation 150. The user may also be allowed, or required to, input a user input whether each of the displayed candidate points 151 along the candidate spline interpolation 150 are approved of, and the user may be given the opportunity to adjust any or all of the candidate points 151, e.g. using drag-and-drop or the like with a touchscreen display, a computer mouse, a trackball and so on.

In a step S600, the candidate spline interpolation for the first effective time point is automatically adapted based on the input segmented digital representation, in particular based on the 3-dimensional image data for the first effective time point.

As part of step S600, the candidate spline interpolation 150 may be used to generate additional support points (in addition to the candidate points) along the candidate spline interpolation. The additional support points may be generated such as to divide spline sections between the candidate points 151 into equal sub-sections or such as to divide the complete candidate spline interpolation 150 into equal sub-sections regardless of the candidate points 151.

The number of additional support points may be between 1 and 100, and is preferably between 20 and 50.

Automatically adapting the candidate spline interpolation 150 advantageously further comprises automatically determining (or: checking) for each of the candidate points 151 and/or all of the generated additional support points whether they coincide with an inward surface of a blood-carrying structure (e.g. a heart chamber) of, or adjacent to, the annulus structure to be determined. As has been described,
an inward surface of the blood-carrying structures may be automatically generated, e.g. by merging labelled blood volumes of the input segmented digital representation and determining the outer contour of the merged blood volumes which corresponds to the inward surface of the blood-carrying structures.

In the case of the tricuspid (mitral) valve, for example, labelled blood volumes for the right (left) atrium and the right (left) ventricle may be merged and the outer contour of said merged blood volumes may be set as the combined inward surfaces of the right (left) atrium and the right (left) ventricle, which comprises the inward surface of the tricuspid (mitral) annulus structure. In some advantageous embodiments, only the already determined points of interest are used for the merging since the points of interest are closest to the annulus structure to be determined.

The inward surfaces of the blood-carrying structures may already have been generated and used in previous steps, e.g. for providing the 3-dimensional view 140.

Automatically adapting the candidate spline interpolation 150 further comprises moving (i.e. adjusting the position) of each of the additional support points such that it is shifted to the inward surface of the blood-carrying structure. Preferably, each point is shifted, generally in three spatial dimensions, to a respective point of the inward surface of the blood-carrying structure which has the shortest distance to the point to be shifted. In some embodiments, the same is performed automatically for the candidate points 151; in other embodiments, suggested shifts of the candidate points 151 (if necessary, i.e. if the candidate points 151 do not all already lie on the inward surface) may be automatically determined and suggested to the user by the GUI (e.g. graphically), which the user may then approve or dismiss.

After the positions of the additional support points and/or the candidate points 151 have been fixed, an adapted candidate spline interpolation is determined by generating a spline interpolation using the previously fixed points as support points.

Figure 8:
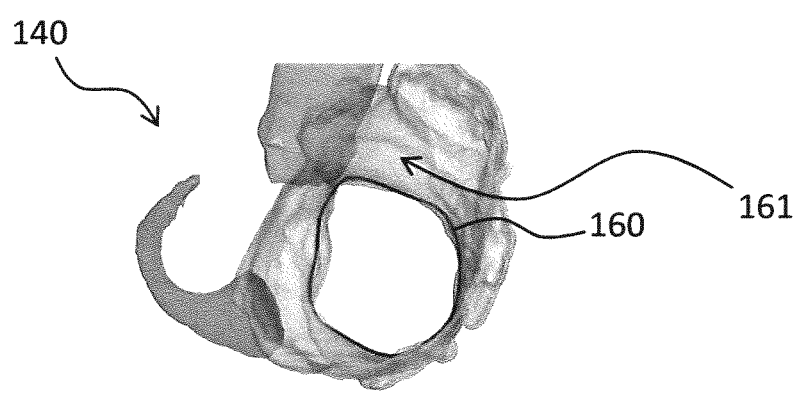
FIG. 8 shows a schematic illustration of a result of the method according to FIG. 1.

FIG. 8 schematically illustrates the adapted candidate spline interpolation 160 arranged with respect to the 3-dimensional view 140 which may be displayed to the user by the GUI. It is evident that the adapted candidate spline interpolation 160 fits the inward surfaces 161 of the blood-carrying structures excellently.

In a step S700, a digital representation of the annulus structure at the first effective time point based on the adapted candidate spline interpolation is provided. In some embodiments, the adapted candidate spline interpolation 160 itself is provided as the digital representation of the annulus structure at the first effective time point. In principle, the digital representation of the annulus structure is desired to be as close as possible to the actual annulus structure of the human internal organ from which the image date of the input segmented digital representation correspond. However, in some cases (e.g. the D-shape of the mitral annulus), as will be discussed in the following, the digital representation of the annulus structure may be deliberately different from the anatomically correct annulus structure.

In some advantageous embodiments, a 3-dimensional surface inside the digital representation of the annulus structure may be generated and used for automatically updating (or: improving) the segmentation of the input segmented digital representation by replacing the previously determined border surface between the two blood-carrying structures divided by the annulus structure with said 3-dimensional surface inside the digital representation of the annulus structure. The method according to the first aspect of the present invention may then optionally be repeated at least once based on the updated input segmented digital representation.

The digital representation of the annulus structure may also comprise, or consist of, the adapted candidate spline interpolation 160 which has been provided with a predetermined thickness or diameter based on empirical medical data regarding that particular annulus structure.

In optional further steps, the digital representation of the annulus structure may be used for determining important medical or clinical parameters. For example, for many valves planar annular implants exist in pre-made sizes. The digital representation of the annulus structure may be projected into a best-fit plane (e.g. as previously described), and parameters such as minimal diameter, maximal diameter, mean diameter, area, perimeter, center, eccentricity (i.e. circular/elliptic) and so on may be automatically determined from said projections and output in an output signal. Such parameters will give a physician or medical technical valuable input for selecting an optimal implant from an available selection of implant types and/or sizes.

Furthermore, distances of the digital representation of the annulus structure from structures of interest may be automatically determined and output in an output signal. For example, in case of the tricuspid valve, the minimal distance from the digital representation of the annulus structure to the right coronary artery may be automatically determined.

All of the determined parameters and/or distances may be visualized in the 3-dimensional view 140 by the GUI. Even at this stage, the user may have the option to adjust some of the candidate points 151 and/or additional support points. The GUI may then show the user, preferably in real-time, the effects of such adjustments on the determined parameters. In that way, if the user is e.g. not completely certain with the position of one specific candidate point 151, the user may investigate which choice for that candidate point 151 results in the most desired parameters, and may then accordingly select that choice for it.

The best-fit plane for the digital representation of the annulus structure may also serve as a useful indicator for an implant position.

In the following, advantageous options in particular in case of the mitral valve will be discussed.

Figure 9:
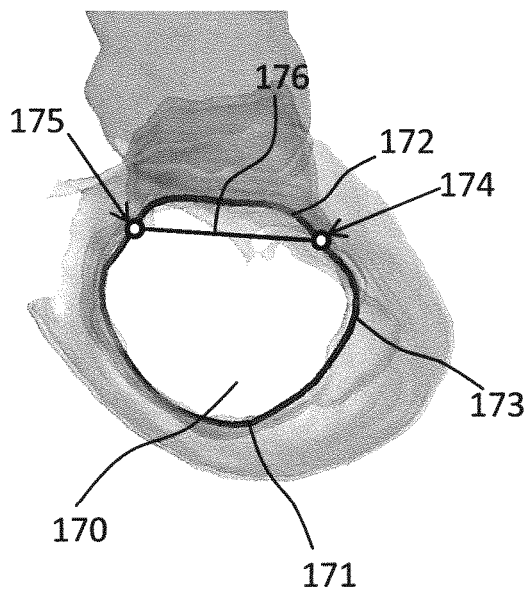
FIG. 9 and FIG. 10 show schematic illustrations of the mitral annulus in connection to variants of the method according to FIG. 1.
Figure 10:
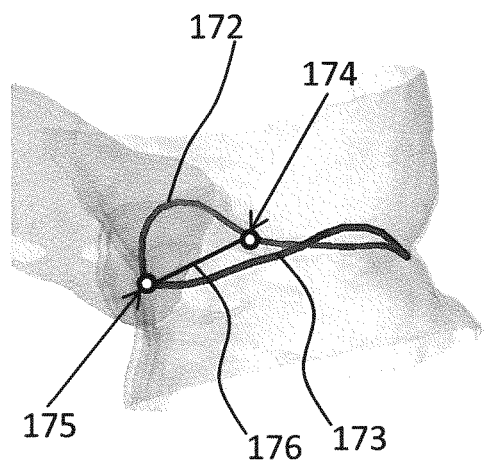

FIG. 9 and FIG. 10, respectively, schematically illustrate two views of the annulus 171 of the mitral valve 170. The mitral annulus 170 crosses two trigone structures: the lateral trigone 175 and the medial trigone 174. The two trigones 175, 176 separate the mitral annulus 170 into a so-called anterior mitral annulus 172 (close to the left coronary cusp (of the aortic valve) and the non-coronary cusp (of the aortic valve) on one side and the so-called posterior mitral annulus 173 (close to the posterior leaflet of the mitral valve 170) on another side.

FIG. 9 shows an en-face-view of the mitral valve 170, and FIG. 10 shows a three-dimensional view. As FIG. 10 shows, the mitral annulus 171 is generally saddle-shaped. For medical purposes, often the so-called D-shape of the mitral annulus 171 is useful.

For the D-shape, the anterior mitral annulus 172 is generally replaced by short-cut section 176 between the trigones 174, 175, e.g. by a straight line. The short-cut section 176 together with the posterior mitral annulus 173 form the D-shape which is often used for determining parameters (minimal, maximal, average diameters, perimeters and so on) for implant fitting. Often, a best-fit plane for a mitral annulus implant is determined and displayed not for the complete digital representation of the annulus structure, but for the D-shape instead.

In some advantageous embodiments of the method according to the first aspect of the present invention, positions of the mitral trigones 174, 175 are automatically determined from the input segmented digital representation, and the candidate spline interpolation 150 is divided into candidates for the anterior and the posterior mitral annulus 172, 173, respectively, based on the input segmented digital representation. Then, in steps S600 and S700, candidate points 151 and/or additional support points on the candidate posterior mitral annulus 173 are used so that the generated 3-dimensional digital representation of the annulus structure itself already is in the D-shape. The short-cut section 176 may be one or multiple of the spline sections of the adapted candidate spline interpolation 160. Alternatively, said spline section (or respectively sections) between the two trigones 174, 175 may be removed, and a straight line may be drawn instead as the short-cut section 176 in order to generate the D-shape.

Optionally, candidate points for the mitral trigones 174, 175 may be automatically determined (or suggested to the user and approved and/or adjusted by the user) and used as further support point for the candidate spline interpolation 150, which may further improve the accuracy of the short-cut section 176.

As an alternative, only candidate points 151 from the 2-chamber view and the 4-chamber view of the mitral valve may be used such that steps S600 and S700 will automatically result in the D-shape (optionally with a linear short-cut section between the two candidate points closest to the aortic valve) as the digital representation of the mitral annulus 171.

In the examples described so far, the digital representation of the annulus structure has been a 3-dimensional digital representation. After it is generated, it may optionally be used to generate a 4-dimensional digital representation, i.e. a discrete or even continuous series of 3-dimensional digital representations (e.g. a 3-dimensional "video" of the annulus structure). In particular when the annulus structure is of a valve that changes its shape over time in the human body, a 4-dimensional digital representation is useful to physicians and medical technicians in order to evaluate the entire range of possible states of the annulus structure during its operation in the human body. This is particularly true for the atrioventricular valves (mitral and tricuspid).

One way to produce a 4-dimensional digital representation is to perform the steps S200 to S700 for a plurality of effective time points, for example for all effective time points for which 3-dimensional image data are available in the input segmented digital representation. The 4-dimensional digital representation may then be provided as the resulting discrete set of 3-dimensional digital representations of the annulus structure. In some advantageous embodiments, an interpolation between each pair of adjacent (in effective time) 3-dimensional digital representations may be performed such that a continuous or quasi-continuous 4-dimensional digital representation is generated.

The 4-dimensional digital representation may be displayed to the user by the GUI, who may then rotate it, zoom in or out, pause, accelerate, slow down etc. the 3-dimensional video in order to study the workings of the annulus structure in detail.

Alternatively, a sub-set of the available effective time points may be determined, and the 4-dimensional digital representation may be generated only for said sub-set, for example for one effective time point for each diastolic and systolic phase of the human heart.

As a further alternative, the adapted candidate spline interpolation 160 for the first effective time point may be modified based on properties of the segmented digital representation regarding at least one second effective time point in order to generate a respective candidate spline interpolation for the at least one second effective time point. For example, instead of the image data for the first effective time point, image data for the second effective time point may be used for adapting the candidate spline interpolation 150 in order to generate the adapted candidate spline interpolation for the second effective time point. The 4-dimensional digital representation of the annulus structure may then be provided, as has been described in the foregoing, as a discrete, or interpolated continuous or quasi-continuous, sequence of 3-dimensional digital representations of the annulus structure.

Figure 11:
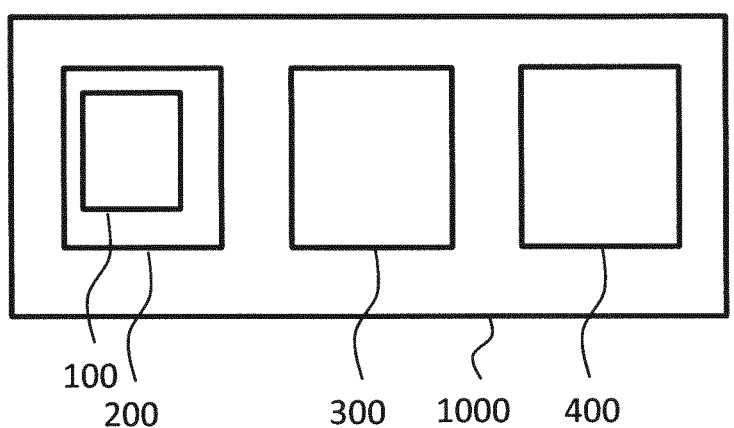
FIG. 11 shows a schematic block diagram illustrating a system according to an embodiment of the third aspect of the invention.

FIG. 11 shows a schematic block diagram illustrating a system 1000 for generating a digital representation of an annulus structure of a valve from a segmented digital representation of a human internal organ. The system 1000 comprises a display device configured to implement a GUI 100, a user interface 300 and a computing device 400 operatively coupled to the display device 200 and the user interface 300. The display device 200 and the user interface 300 may be integrated, e.g. in the form of a touchscreen display. The user interface 300 may comprise a computer mouse, a trackball, and/or the like. The computing device 400 may be realized partially or completely as a cloud computing platform or as a server remote from the display device 200.

The system 1000 is configured to perform the method according to the first aspect of the invention, for example the method as has been described with respect to FIG. 1 through 9 including all options and/or variations of the method. In particular, the display device 200 may be configured and controlled to implement the GUI 100 as it has been described in the foregoing.

Figure 12:
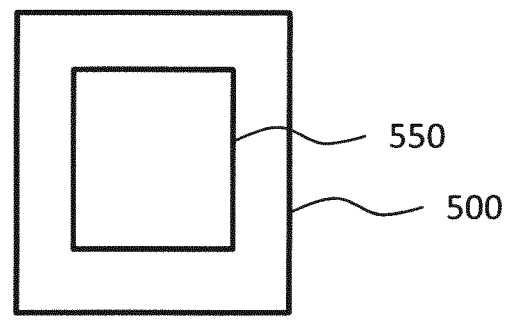
FIG. 12 shows a schematic block diagram illustrating a non-transitory computer-readable data storage medium according to the fourth aspect of the invention.

FIG. 12 shows a schematic block diagram illustrating a non-transitory computer-readable data storage medium 500 according to the fourth aspect of the invention. The data storage medium 500 comprises executable program code 550 configured to, when executed, perform the method according to the first aspect. The data storage medium 500 may consist of, or comprise, a CD-ROM, a memory stick, a USB stick, a hard drive, a solid-state data storage device, a DVD, a BluRay-disc, an/or the like.

Figure 13:
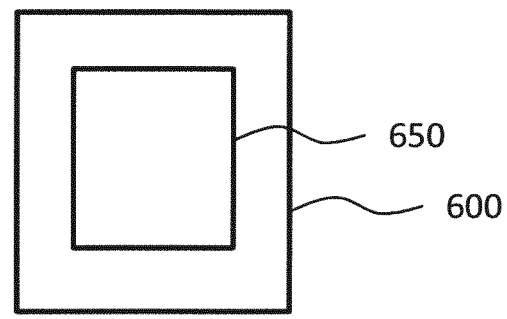
FIG. 13 shows a schematic block diagram illustrating a computer program product according to the fifth aspect of the invention.

FIG. 13 shows a schematic block diagram illustrating computer program product 600 according to the fifth aspect of the invention. The computer program product 600 comprises executable program code 650 configured to, when executed, perform the method according to the first aspect.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A method for generating a digital representation of an annulus structure of a heart valve from a segmented digital representation of a human heart, comprising:
   a) providing an input segmented digital representation of a plurality of portions of a human heart comprising an annulus structure of a heart valve, wherein the input segmented digital representation provides labels for the portions of the digital representation, which labels indicate specific properties of the respective portion and/or belonging of the respective portion to a specific anatomic structure, wherein the digital representation comprises, and/or is based on, multi-slice computed tomography image data for three spatial dimensions for each of at least one effective time point;
   b) automatically determining, for at least a first effective time point, based on the labels of the provided input segmented digital representation, a candidate plane, and/or a candidate orientation vector together with a candidate center point, arranged with respect to the input segmented digital representation for the first effective time point;
   d) automatically determining a plurality of candidate points for the annulus structure at the first effective time point based on the input segmented digital representation, wherein automatically determining a plurality of candidate points includes determining a plurality of selecting cross-sections with respect to the input segmented digital representation at the first effective time point, wherein the selecting cross-sections are arranged essentially orthogonally to the candidate plane and/or essentially comprise the candidate center point and the candidate orientation vector;
   e) automatically generating a candidate spline interpolation for the first effective time point using the determined candidate points as support points;
   f) automatically adapting the candidate spline interpolation for the first effective time point based on the input segmented digital representation; and
   g) generating a digital representation of the annulus structure at the first effective time point based on the adapted candidate spline interpolation,
   wherein
   the annulus structure to be determined belongs to a first valve of the human heart;
   a candidate center point for a second valve of the human heart is automatically determined; and
   at least one of the plurality of selecting cross sections is automatically determined as a plane which intersects the automatically determined candidate center point of the second valve.

2. The method of claim 1, wherein the candidate plane, the candidate orientation vector and/or the candidate center point is automatically determined using a support vector machine trained to separate differently labelled portions.

3. The method of claim 1, wherein:
   the heart valve is a tricuspid valve; and
   the candidate plane is determined as a plane which best separates a right atrium and a right ventricle in the provided input segmented digital representation of the human heart and/or as a best-fit plane which best fits a plane in which a right coronary artery is mostly positioned.

4. The method of claim 1, wherein:
the heart valve is a mitral valve; and
the candidate plane is determined as a plane which best separates a left atrium and a left ventricle in the provided input segmented digital representation of the human heart and/or by a best-fit plane which best fits a plane in which a coronary sinus and/or a left circumflex artery is mostly positioned.

5. The method of claim 1, wherein:
providing the input digital representation comprises providing a preliminary digital representation comprising a digital representation of at least one blood volume; and
the method further comprises:
determining an outer contour of the digital representation of the at least one blood volume; and
providing the input digital representation based on the determined outer contour.

6. The method of claim 1, wherein:
step g) comprises generating a 3-dimensional representation of the annulus structure for the first effective time point;
the adapted candidate spline interpolation for the first effective time point is modified based on properties of the segmented digital representation regarding at least one second effective time point in order to generate a respective candidate spline interpolation for the at least one second effective time point; and
a 3-dimensional digital representation of the annulus structure for the at least one second effective time point is provided based on the generated adapted candidate spline interpolation for the at least one second effective time point, and
the method further comprises:
generating a 4-dimensional digital representation of the annulus structure based at least on the 3-dimensional representations of the annulus structure for the first effective time point and for the at least one second effective time point.

7. The method of claim 1, wherein:
step g) comprises generating a 3-dimensional digital representation of the annulus structure for the first effective time point; and
steps b) to g) are performed for at least one third effective time point, and
the method further comprises:
generating a 4-dimensional digital representation of the annulus structure based on at least the 3-dimensional digital representations of the annulus structure for the first effective time point and for the at least one third effective time point.

8. The method of claim 6, wherein different effective time points correspond to different states within a cardiac cycle.

9. The method of claim 1, further comprising:
determining a best-fit plane for the digital representation of the annulus structure for at least the first effective time point; and
generating a 2-dimensional representation or projection of the digital representation of the annulus structure at the first effective time point in the determined best-fit plane.

10. The method of claim 1, further comprising:
determining a position and orientation of the generated digital representation of the annulus structure with respect to the input segmented digital representation; and
determining at least one distance from at least one point of the generated digital representation of the annulus structure to at least one portion of the input segmented digital representation, or to another point of the generated digital representation of the annulus structure, at at least one effective time point.

11. The method of claim 1, wherein in step d), the plurality of candidate points is determined based on all or on some points on the border between labelled portions of the input segmented digital representation representing leaflets of the heart valve and labelled portions representing the outer contour of the surrounding blood volume or tissue of the heart valve.

12. The method of claim 1, wherein in step d), the plurality of candidate points is determined based on all or on some points of a labelled portion of the input segmented digital representation representing an attachment region or outer contour of leaflets of the heart valve.

13. The method of claim 1, wherein in step f), the candidate spline interpolation for the first effective time point based is automatically adapted based on all or on some points on the border between labelled portions of the input segmented digital representation representing leaflets of the heart valve and labelled portions representing the outer contour of the surrounding blood volume or tissue of the heart valve.

14. The method of claim 1, wherein in step f), the candidate spline interpolation for the first effective time point based is automatically adapted based on all or on some points of a labelled portion of the input segmented digital representation representing an attachment region or outer contour of leaflets of the heart valve.

15. The method of claim 1, further comprising:
using the generated digital representation of the annulus structure for training an artificial intelligence entity.

16. A system for generating a digital representation of an annulus structure of a heart valve from a segmented digital representation of a human heart, comprising:
a computing device configured to:
provide an input segmented digital representation of a plurality of portions of a human heart comprising an annulus structure of a heart valve, wherein the input segmented digital representation provides labels for the portions of the digital representation, which labels indicate specific properties of the respective portion and/or belonging of the respective portion to a specific anatomic structure, wherein the digital representation comprises, and/or is based on, multi-slice computed tomography image data for three spatial dimensions for each of at least one effective time point;
automatically determine, for at least a first effective time point, based on the labels of the provided input segmented digital representation, a candidate plane, and/or a candidate orientation vector together with a candidate center point, arranged with respect to the input segmented digital representation for the first effective time point;
automatically determine a plurality of candidate points for the annulus structure at the first effective time point based on the input segmented digital representation including determining a plurality of selecting cross-sections with respect to the input segmented digital representation at the first effective time point, wherein the selecting cross-sections are arranged essentially orthogonally to the candidate plane and/ or essentially comprise the candidate center point and the candidate orientation vector;

automatically generate a candidate spline interpolation for the first effective time point using the determined candidate points as support points;

automatically adapt the candidate spline interpolation for the first effective time point based on the input segmented digital representation; and generate a digital representation of the annulus structure at the first effective time point based on the adapted candidate spline interpolation, wherein the annulus structure to be determined belongs to a first valve of the human heart and the computing device is further configured to automatically determine a candidate center point for a second valve of the human heart and to automatically determine at least one of the plurality of selecting cross sections as a plane which intersects the automatically determined candidate center point of the second valve.

* * * * *